April 11, 1961 L. C. BURNETT 2,979,638

ELECTRIC PULSE COUNTING ARRANGEMENT

Filed June 29, 1959 3 Sheets-Sheet 1

INVENTOR
LIONEL CLIFFORD BURNETT

BY Craig & Freudenberg

ATTORNEYS

April 11, 1961 L. C. BURNETT 2,979,638

ELECTRIC PULSE COUNTING ARRANGEMENT

Filed June 29, 1959 3 Sheets-Sheet 2

INVENTOR
LIONEL CLIFFORD BURNETT
BY Craig + Freudenberg
ATTORNEYS

ELECTRIC PULSE COUNTING ARRANGEMENT

Filed June 29, 1959 3 Sheets-Sheet 3

INVENTOR
LIONEL CLIFFORD BURNETT
BY Craig & Freudenberg
ATTORNEYS

United States Patent Office 2,979,638

Patented Apr. 11, 1961

2,979,638

ELECTRIC PULSE COUNTING ARRANGEMENT

Lionel C. Burnett, Nottingham, England, assignor to Ericsson Telephones Limited, Nottingham, England Filed June 29, 1959, Ser. No. 823,657

Claims priority, application Great Britain June 30, 1958

10 Claims. (Cl. 315—84.6)

Figure 1:
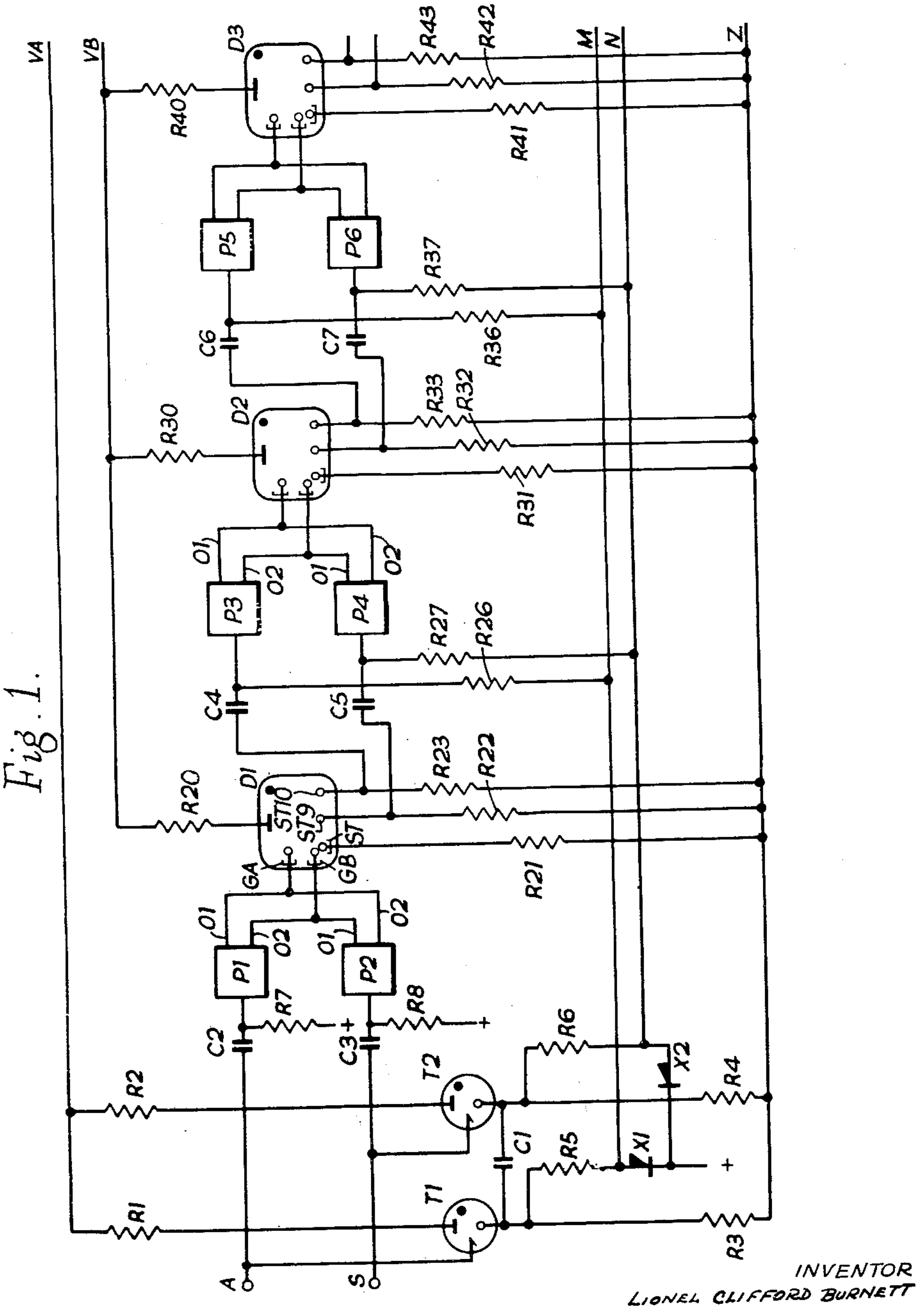

The present arrangement relates to electric pulse counting arrangements of the type comprising a plurality of multi-electrode discharge devices each having an associated pulse modifying network such that the application of successive pulses to the pulse modifying network causes a conductive discharge in the associated device to be stepped successively from one signal electrode to another by way of a plurality of intermediate electrodes between each pair of signal electrodes and the movement of a conductive discharge to a predetermined signal electrode causes an output pulse to be produced thereat.

It is well known to provide electric pulse counting arrangements comprising a plurality of multi-electrode discharge devices and associated pulse modifying networks connected in cascade, that is to say, the predetermined signal electrode of one device is connected to the pulse modifying network of the succeeding device, and so on. Such pulse counting arrangements are used as additive counters in which the cyclic movement of a discharge in a device is in one direction only, and the signal electrodes invested with discharges in the plurality of devices are indicative of the number of pulses applied to the arrangement. Such pulse counting arrangements may also be used as subtractive counters when the plurality of electrodes invested with discharges at the commencement of the count is indicative of a number, and the cyclic movement of a discharge in a device is in such a direction as to reduce progressively the number indicated in accordance with the number of pulses applied.

It is often desirable to count the numerical difference between electric pulses from two contradictory sources of which a pulse from one source is indicative of an addition of one to a total and a pulse from the other source is indicative of a subtraction of one from said total.

It is the object of the present invention to provide such pulse counting arrangements.

According to the present invention an electric pulse counting arrangement comprises first and second multi-electrode discharge devices connected in cascade through first and second connecting pulse modifying networks, and first and second input pulse modifying networks connected to the first device and adapted to step a discharge in the first device in one direction and the other direction respectively in response to input pulses, the first connecting network being adapted to step a discharge in the second device in one direction in response to the movement of the discharge in the first device in a corresponding direction to a first predetermined electrode and the second connecting network being adapted to step the discharge in the second device in the opposite direction in response to movement of the discharge in the first device in a corresponding opposite direction to another predetermined electrode.

Further discharge devices may be connected in cascade with the first and second devices through further pairs of pulse modifying networks.

Multi-electrode discharge devices as described in British patent specification No. 712,171 may be used, although the invention is not confined to any one particular type of multi-electrode discharge device. In the devices described in the aforesaid patent specification a plurality of cathode electrodes are arranged around and equidistantly from a common anode electrode, the plurality of cathode electrodes being a multiple of three and every third cathode electrode constituting a signal electrode. The two cathode electrodes between adjacent signal electrodes are guide electrodes and one of each pair is termed a first guide electrode and the other a second guide electrode. It is a feature of these devices that a discharge is caused to move from one cathode electrode to another when either a sufficiently more negative potential is applied to the latter cathode electrode or with a sufficiently negative potential at the latter cathode the potential applied to the former cathode is made sufficiently less negative. It is also a characteristic of these devices that the discharge will move to the nearest more negative cathode electrode in preference to moving to a more distant electrode at a still more negative potential.

According to the invention there is provided an electric pulse counting arrangement comprising a plurality of multi-electrode discharge devices connected in cascade by a plurality of pairs of pulse modifying networks, a first network of a pair being adapted to step a conductive discharge in a discharge device in one direction in response to the movement of a discharge in the next preceding device in a corresponding direction to a predetermined electrode and the second network of a pair being adapted to step said conductive discharge in the opposite direction in response to the movement of a discharge in the said next preceding device in a corresponding opposite direction to another predetermined electrode, a first input circuit connected to the first discharge device of the cascade and adapted to step a discharge therein in a direction corresponding to the said one direction in response to an applied pulse, and a second input circuit connected to said first discharge device of the cascade and adapted to step a discharge in a direction corresponding to the said opposite direction in response to an applied pulse, in which the application of a pulse to the first input circuit causes all the first pulse modifying networks to be put in a pulse responsive condition and all the second pulse modifying networks in an unresponsive condition, and the application of a pulse to the second input circuit causes all the second pulse modifying networks to be put in a pulse responsive condition and all the first pulse modifying circuits in an unresponsive condition.

Figure 2:
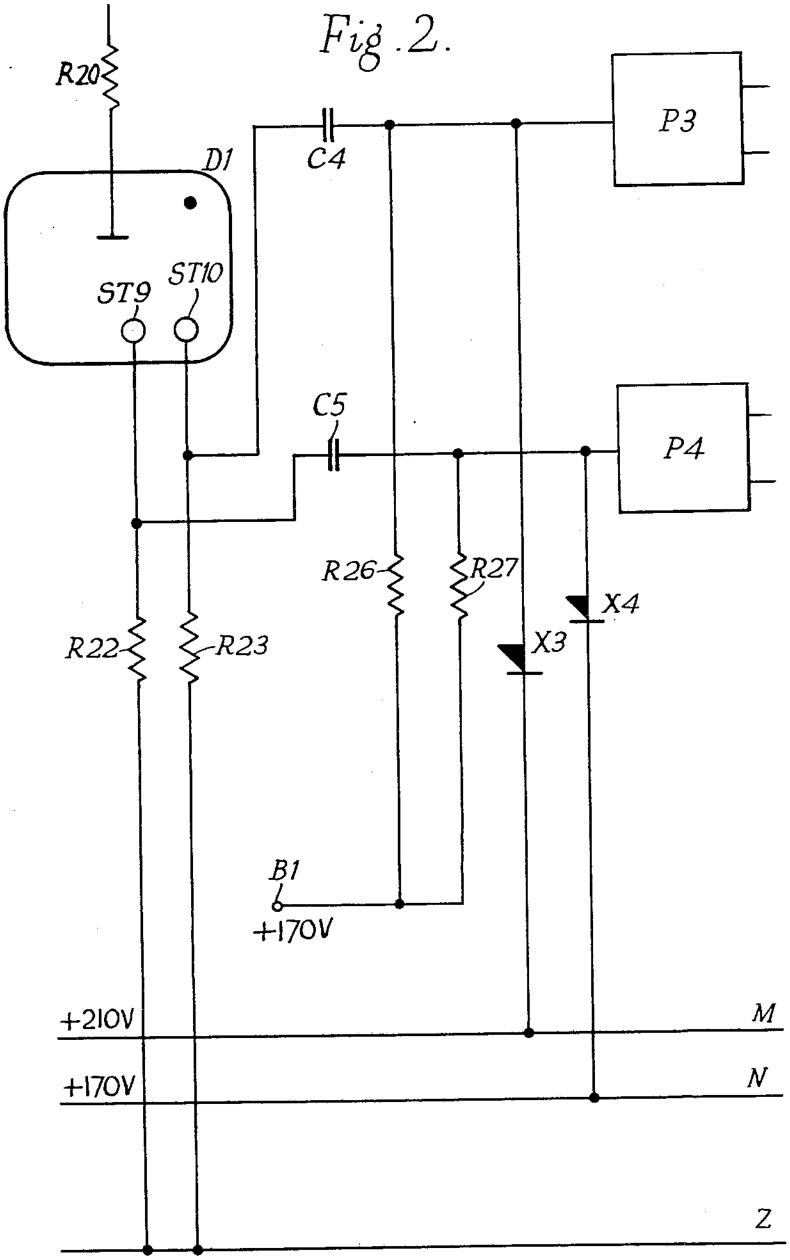
Figure 3:
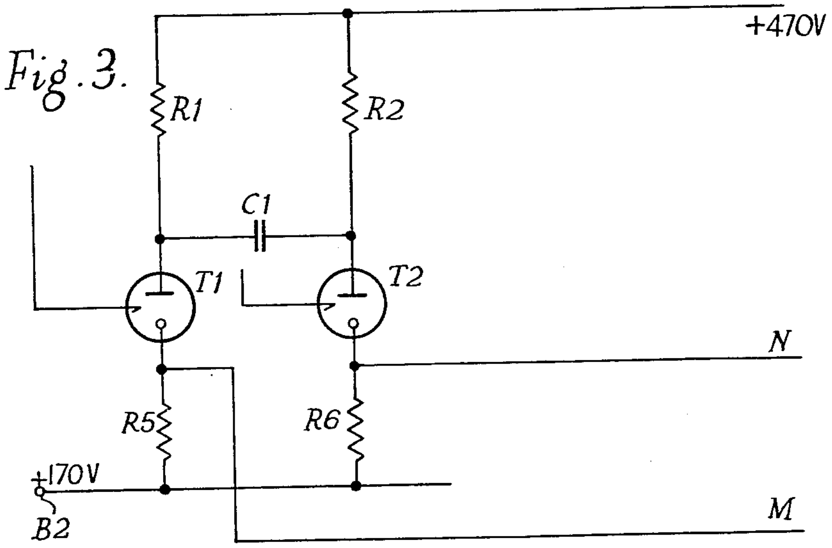
Figure 4:
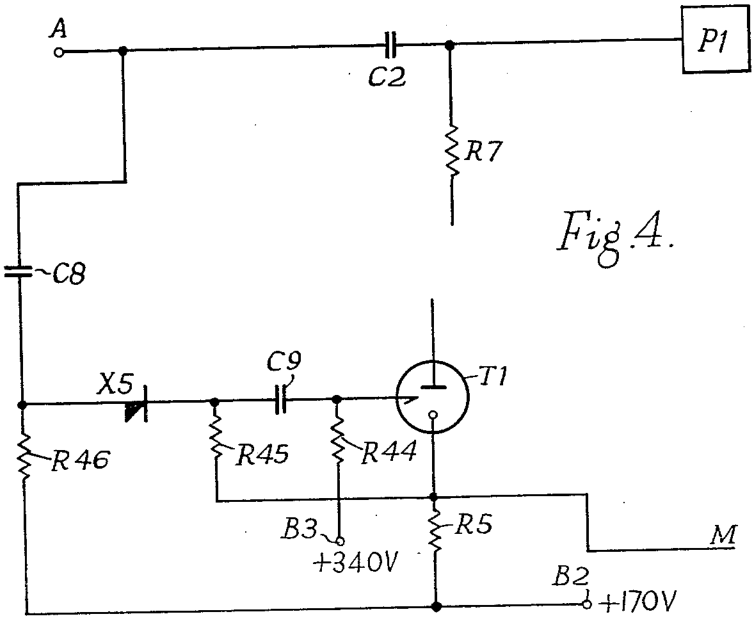

The invention will now be described, by way of example, with reference to the accompanying drawings, in which:

Fig. 1 is a circuit diagram of a pulse counter suitable for addition and subtraction, and Figs. 2, 3 and 4 show modifications of the circuit of Fig. 1.

In the circuit of Fig. 1 three multi-electrode discharge devices D1, D2 and D3 are provided. Each discharge device has thirty cathode electrodes spaced equidistantly from and around a common anode. Every third electrode will be termed a signal electrode ST and each pair of electrodes between adjacent signal electrodes ST will be termed guide electrodes GA and GB. In operation a discharge on a signal electrode ST is transferred to the next cathode ST by sequentially lowering the potentials of the guide electrodes GA and GB. When the potentials of the guide electrodes GA and GB are lowered sequentially in that order, the discharge will be assumed to move in a counter-clockwise direction. Hence when the potentials of the guide electrodes are lowered in the reverse order the discharge will move in a clockwise direction.

An input terminal A is connected to the trigger electrode of a cold-cathode trigger tube T1 and to a pulse modifying network P1 by way of a capacitor C2. An input terminal S is connected to the trigger electrode of a cold cathode trigger tube T2 and to a pulse modifying network P2 by way of a capacitor C3. The anode electrodes of the cold cathode trigger tubes T1 and T2 are connected to a source of positive potential VA through two resistors R1 and R2 respectively, and the cathode electrodes of the tubes T1 and T2 are connected to a common negative line Z through two resistors R3 and R4 respectively and are connected together through a capacitor C1. One output lead O1 of the pulse modifying network P1 is connected to the guide electrodes GA of the discharge device D1 and another output lead O2 is connected to the guide electrodes GB of the device D1. An output lead O1 of the pulse modifying network P2 is connected to the guide electrodes GB and an output lead O2 is connected to the guide electrodes GA of the device D1. The anodes of the devices D1, D2 and D3 are connected to a source of positive potential VB through three resistors R20, R30 and R40 respectively. The first eight signal electrodes, represented by one electrode designated ST of the device D1 are connected together and to the common negative line Z through a resistor R21 and the ninth and tenth signal electrodes ST9 and ST10 are connected to the common negative line Z through resistors R22 and R23 respectively. The signal electrode ST10 is connected to a further pulse modifying network P3 through a capacitor C4 and the signal electrode ST9 is connected to a pulse modifying network P4 through a capacitor C5. Output leads O1 and O2 of the pulse modifying networks P3 and P4 are connected to the guide electrodes GA and GB of the multi-electrode device D2 in the manner of the connections to device D1. Similarly the signal electrodes ST9 and ST10 of the multi-electrode device D2 are connected to pulse modifying networks P5 and P6 respectively.

Each pulse modifying network P is of a type suitable to provide sequential negative going pulses to step cyclically a discharge in multi-electrode device D from one signal electrode ST to another by way of a pair of guide electrodes GA and GB. Such pulse modifying circuits are depicted and described in British patent specification No. 751,952. The input leads of the networks P1 and P2 are connected to a source of positive potential through two resistors R7 and R8 respectively. The input leads of the pulse modifying networks P3 and P5 are also connected to a common line M by way of resistors R26 and R36 respectively and the input leads of the pulse modifying networks P4 and P6 are connected to a common line N by way of resistors R27 and R37. It is arranged that a pulse modifying network P3, P4, P5 or P6 is unable to provide the sequential negative going pulses unless a predetermined positive potential is present on its associated common line M or N. The lines M and N are connected to the cathodes of the tubes T1 and T2 respectively through two resistors R5 and R6 and also to a source of positive potential through two rectifiers X1 and X2 respectively. When the tubes T1 and T2 are not conducting the lines M and N are at the negative potential of the line Z and accordingly the networks P3, P4, P5 and P6 are prevented from operating. When, for example, a pulse is applied to the terminal A, the tube T1 is rendered conducting, its cathode potential rises and with it the potential of the line M. The networks P3 and P5 are thus rendered responsive. The functioning of the trigger tubes T1 and T2 is described in greater detail in the aforementioned British patent specification No. 751,952.

A source of positive going pulses is connected to the input terminal A. Each pulse from the source is indicative of an addition to a total and will hereinafter be referred to as an add pulse. A further source of positive going pulses is connected to input terminal S. Each pulse from the further source is indicative of a subtraction from the total and will hereinafter be referred to as a subtract pulse. It is arranged that an add pulse and a subtract pulse do not occur simultaneously. When an add pulse is applied to the input terminal A a discharge is produced between the anode and cathode electrodes of cold cathode trigger tube T1. The resultant flow of current causes the cathode end of the resistor R3 to become positive with respect to the common negative line Z and this positive potential is applied to the common line M by way of the resistor R5. Cold cathode trigger tube T2 is not conducting so that common line N is at the same potential as the common negative line Z. The add pulse is also applied to the pulse modifying network P1 which has a positive potential applied thereto by way of resistor R7. The pulse modifying network P1 produces a pair of sequential negative going pulses at its output leads O1 and O2 in that order and causes the discharge in the discharge device D1 to step in a counter-clockwise direction from one signal electrode ST to another. At the cessation of the add pulse the cold cathode trigger tube T1 continues to conduct. Further add pulses applied to the input terminal A step the discharge in the discharge device D1 in a counter-clockwise direction until it moves to the signal electrode ST9. When the discharge in discharge device D1 invests the signal electrode ST9 the resultant current flowing causes the potential at the electrode end of the resistor R22 to become more positive and this positive going potential is applied to the pulse modifying network P4. The pulse modifying network P4 does not produce a pair of negative going pulses at its output leads O1 and O2 because the cold cathode trigger tube T2 is not conducting and a positive potential is not present on the common lead N. When a further add pulse is applied to the input terminal A, the discharge in the discharge device D1 moves from signal electrode ST9 to signal electrode ST10 and the resultant flow of current causes the potential at the electrode end of the resistor R23 to become more positive and this positive going potential is applied to the pulse modifying network P3 by way of the capacitor C4. The cold cathode trigger tube T1 is conducting and the positive potential present on the common lead M in conjunction with the positive potential derived from the signal electrode ST10 causes the pulse modifying network P3 to produce a pair of negative going pulses which are applied to the guide electrodes GA and GB of the discharge device D2. A discharge present in the discharge device D2 is thus caused to move from one signal electrode ST to another by way of a pair of guide electrodes GA and GB. The movement of the discharge to the signal electrode ST9 of the device D2 as a result of an add pulse does not produce a pair of negative going pulses at the pulse modifying network P6 since there is no positive potential present on the common line N. However, when the discharge moves to the signal electrode ST10 of the device D2 a pair of negative going pulses is produced at the output leads O1 and O2 of the pulse modifying network P5 since a positive potential is present on the common line M, thereby advancing the discharge in device D3 to the next signal electrode ST in the adding or counter-clockwise direction.

When a subtract pulse is applied to the terminal S a discharge is produced between the anode and cathode of cold cathode trigger tube T2. The resultant flow of current causes the potential at the cathode end of the resistor R4 to become more positive and this positive potential is applied to the common line N by way of the resistor R6. The transient charging current taken by the capacitor C1 causes the potential at the cathode of cold cathode trigger tube T1 to become more positive and the discharge therein is extinguished. Thus the potential of the common line M returns to substantially the same potential as that of the common negative line Z. The subtract pulse is also applied to the pulse modifying network P2 and causes a pair of sequential negative going pulses to be developed at its output leads O1 and O2. Thus a discharge present in the discharge device D1 is caused to move from one signal electrode ST to another in a clockwise direction. When the subtract pulse ceases the cold cathode trigger tube T2 continues to conduct. When the discharge in the discharge device D1 moves from the signal electrode ST1 to the signal electrode ST10 as a result of the application of a subtract pulse to input terminal S, the positive potential developed at the cathode end of the resistor R23 and applied to the pulse modifying network P3 does not produce a pair of negative going pulses at the output leads O1 and O2 of the network P3 since the cold cathode trigger tube T1 is not conducting and a positive potential is not present on the common line M. When the discharge in the discharge device D1 moves from the signal electrode ST10 to the signal electrode ST9 the positive potential developed at the electrode end of resistor R22 is applied to the pulse modifying network P4. A positive potential is present on the common line N and is applied to pulse modifying network P4. Thus the pulse modifying network P4 produces a pair of sequential negative going pulses which are applied to the guide electrodes GB and GA of the device D2, in that order, causing a discharge in the discharge device D2 to move from one signal electrode ST to another in the subtracting or clockwise direction. A plurality of subtract pulses applied to the input terminal S will step a discharge in the discharge device D1 cyclically in an anti-clockwise direction so that each time the discharge invests the signal electrode ST9 the discharge in the discharge device D2 is caused to move one step in the same direction. In a similar manner each time the discharge in the discharge device D2 is caused to invest the signal electrode ST9 as a result of the application of a subtract pulse to input terminal S the discharge in the discharge device D3 is caused to move one step in the subtracting or clockwise direction.

The subsequent application of an add pulse to input terminal A extinguishes the discharge in cold cathode trigger tube T2 and causes a discharge to be produced in cold cathode trigger tube T1. Thus the positive potential is removed from common line N and a positive potential applied to common line M. The asymmetrical conducting elements X1 and X2 limit the positive excursion of the voltage on common lines M and N.

Although in the arrangement shown only three discharge devices D are employed such an arrangement may be extended by adding further discharge devices D and associated pairs of pulse modifying networks P.

In the arrangement shown in Fig. 1 the maximum counting rate is determined by the time constant of charge of the capacitors C4 and C5. To take C5 as an example assume the tube T1 to be fixed in response to an add pulse so that the potential on the line M is +150 volts and on the line N is zero. A subtract pulse subsequently applied strikes the tube T2 and extinguishes the tube T1. Thus the potential on the line M falls to zero and that on the line N rises to +150 volts. This positive potential is applied to charge the capacitor C5 through the resistors R27 and R22. Thus the time constant of charge of the capacitor C5 is C5 (R27+R22) and this determines the maximum counting rate. Like considerations apply to the charge of C4 on the application of an add pulse following a subtract pulse.

Fig. 2 of the accompanying drawing is a circuit diagram of a modification to the circuit of Fig. 1 whereby the counting rate can be increased. In Figs. 1 and 2 like parts are given the same reference.

The right-hand plates (in the drawing) of the capacitors C4 and C5 are connected through the resistors R26 and R27 respectively to a terminal B1 at a potential of +170 volts. The same capacitor plates are connected through rectifiers X3 and X4 respectively to the common lines M and N which are connected as shown in Fig. 1 to the trigger tubes T1 and T2 with their associated circuits.

Thus the potential of the line M or N is raised to +210 volts depending upon which of the two tubes T1 and T2 is struck.

The potential of the line, M or N, connected to the extinguished tube T1 or T2 is not, however, allowed to fall to zero and is held at +170 by the rectifier X3 or X4 as appropriate and the potential source B1. Thus the potential rise necessary on the right-hand plate of the capacitor C4 or C5 on changeover from add to subtract or vice versa is 40 volts as against 210 volts in Fig. 1 and hence the delay on changeover can be considerably reduced and a higher counting rate provided.

The changeover time is in all material respects dependent solely upon the time taken to strike and extinguish the tubes T1 and T2 provided the resistance of the resistor R20 is large compared with the resistance from the right-hand plate of C4 through X3 and the line M to earth, and from the right-hand plate of C5 through X4 and the line N to earth.

With the modification of Fig. 2 the tubes T1 and T2 are called upon to supply a bias of no more than +40 volts to supplement the +170 volts steady bias and provide the +210 volts required.

The rectifiers X1 and X2 can, therefore, be dispensed with. Fig. 3 shows a suitable modification to the cathode circuits of the tubes T1 and T2. The lines M and N are taken direct to the cathodes of the tubes T1 and T2 respectively and the resistors R5 and R6 terminate on a terminal B2 at a potential of +170 volts. In Figure 3 the capacitor C1 is illustrated connecting the anodes of the respective tubes T1 and T2, this capacitor having the same function as the capacitor C1 of Figure 1.

Yet another modification is shown in Fig. 4 to overcome the effects of any tendency for the potential of the trigger electrode of the tube T1 to follow the potential of its cathode. In Fig. 4 the trigger electrode of the tube T1 is connected through a resistor R44 to a terminal B3 at a potential of +340 volts and the input terminal A is connected through a capacitor C8, a rectifier X5 and a further capacitor C9 to the trigger electrode of the tube T1. The junction of the rectifier X5 with the capacitor C9 is connected through a resistor R45 to the cathode of the tube T1 and the junction of the capacitor C8 with the rectifier X5 is connected through a resistor R46 to the terminal B2 at +170 volts.

When the tube T1 is conducting the potential of the cathode end of the resistor R5 rises by about 40 volts thus biasing the rectifier X5 and isolating the low trigger electrode-cathode impedance from the input line connected to the terminal A.

I claim:

1. An electric pulse counting arrangement comprising first and second multi-electrode discharge devices, first and second connecting pulse modifying networks connecting said devices in cascade, and first and second input pulse modifying networks connected to the first device and adapted to step a discharge in the first device in one direction and the other direction respectively in response to input pulses, the first connecting network including means to step a discharge in the second device in one direction in response to the movement of the discharge in the first device in a corresponding direction to a first predetermined electrode and said second connecting network including means to step the discharge in the second device in the opposite direction in response to movement of the discharge in the first device in a corresponding opposite direction to another predetermined electrode.

2. An electric pulse counting arrangement according to claim 1, including an inhibiting means for rendering the second and first connecting networks unresponsive on application of an input pulse to the first input network and the second input network, respectively.

3. An electric pulse counting arrangement comprising a plurality of multi-electrode discharge devices, a plurality of pairs of pulse modifying networks connecting said devices in cascade, a first network of a pair being adapted to step a conductive discharge in a discharge device in one direction in response to a pulse caused by the movement of a discharge in the next preceding device in a corresponding direction to a predetermined electrode and the second network of a pair being adapted to step said conductive discharge in the opposite direction in response to a pulse caused by the movement of a discharge in the said next preceding device in a corresponding opposite direction to another predetermined electrode, a first input circuit connected to the first discharge device of the cascade and adapted to step a discharge therein in a direction corresponding to the said one direction in response to an applied pulse, and a second input circuit connected to said first discharge device of the cascade and adapted to step a discharge in a direction corresponding to the said opposite direction in response to an applied pulse, and inhibiting means coupled to said pulse modifying networks whereby the application of a pulse to the first input circuit causes all the first pulse modifying networks to be put in a pulse responsive condition and all the second pulse modifying networks in an unresponsive condition, and the application of a pulse to the second input circuit causes all the second pulse modifying networks to be put in a pulse responsive condition and all the first pulse modifying circuits in an unresponsive condition.

4. An arrangement according to claim 3, wherein each multi-electrode discharge device comprises a plurality of cathode electrodes arranged around and equidistantly from a common anode electrode, the number of cathodes being a multiple of three, every third cathode being a signal electrode and the two intermediate cathode electrodes being first and second discharge guide electrodes, and each pulse modifying network comprises means responsive to a single applied pulse thereat to provide two output pulses in succession, connections being provided to apply one of the output pulses to all the first discharge guide electrodes and the other output pulse to all the second discharge guide electrodes, whereby the discharge can be guided to step in one direction and the opposite direction in dependence upon the timing of the pulses applied to the first and second guide electrodes.

5. An arrangement according to claim 3, wherein the two said input circuits include two cold-cathode trigger tubes respectively, so interconnected that striking of either by an applied pulse causes the other to be extinguished, a common connection being provided from one of the tubes to all the first pulse modifying networks and a common connection from the other tube to all the second pulse modifying networks, each tube when struck enabling a bias potential to be applied to its associated common connection.

6. An arrangement according to claim 5 wherein each pulse modifying network of at least one pair comprises a control circuit including a capacitor and regulating means preventing the complete discharge of the capacitor between successive control pulses.

7. An arrangement according to claim 6, wherein said regulating means includes a rectifier connected between one of said common connections and said pulse modifying network.

8. An arrangement according to claim 5 further comprising a trigger circuit for one of said cold-cathode trigger tubes including an isolating rectifier and a biasing resistor connected between one pole of said rectifier and the cathode of said tube.

9. An electric pulse counting arrangement comprising first and second multi-electrode discharge devices, pulse modifying circuit means connecting said devices in cascade, input pulse modifying circuit means connected to the first device and including two input terminals for receiving pulses to be added and subtracted respectively, said input pulse modifying circuit means including means responsive to input pulses at one of said terminals to step a discharge in the first device in one direction and means responsive to the application of subtraction pulses at the other terminal to step the discharge in the first device in the opposite direction, said connecting pulse modifying circuit means including means responsive to movement of the discharge in the first device in a first direction to a first predetermined electrode to step a discharge in the second device in one direction, and means responsive to movement of the discharge in the first device in a corresponding opposite direction to another predetermined electrode for stepping the discharge in the second device in the opposite direction.

10. An electric pulse counting arrangement according to claim 9, wherein said second multi-electrode discharge device comprises a plurality of cathode electrodes arranged in succession for transfer of the discharge from one to another of said electrodes in different directions, the number of cathodes being a multiple of three, every third cathode being a signal electrode and the two intermediate cathode electrodes being first and second discharge guide electrodes, first and second electrical connections common to said first and second guide electrodes respectively, said connecting pulse modifying circuit means including output terminals connected to said first and second common circuits and including means for determining the sequence of timing of pulses to be applied to said guide electrodes in a manner dependent upon whether the counting direction in the first discharge device requires the second discharge device to step in the adding or in the subtracting direction.

References Cited in the file of this patent

UNITED STATES PATENTS

| | | |
|---|---|---|
| 2,714,179 | Thomas | July 26, 1955 |
| 2,739,266 | Burnett | Mar. 20, 1956 |
| 2,823,336 | Crowther | Feb. 11, 1958 |